United States Patent Office 2,803,936
Patented Aug. 27, 1957

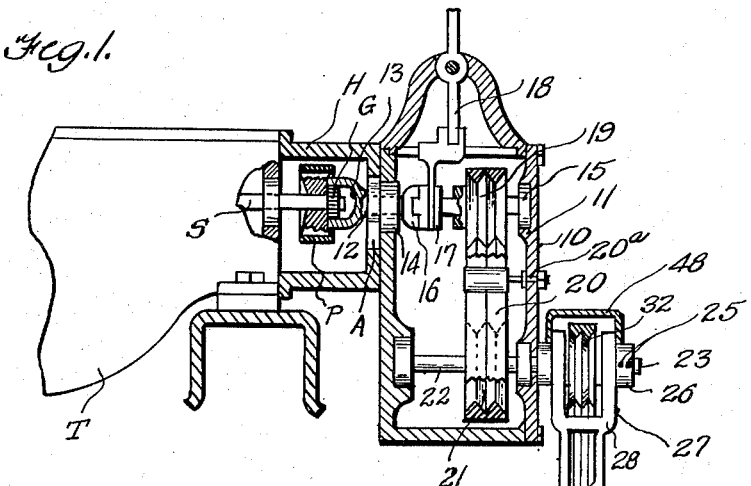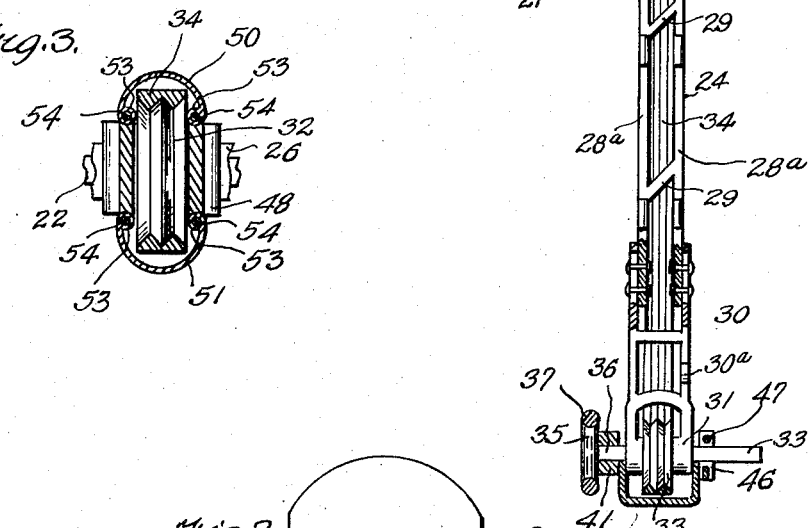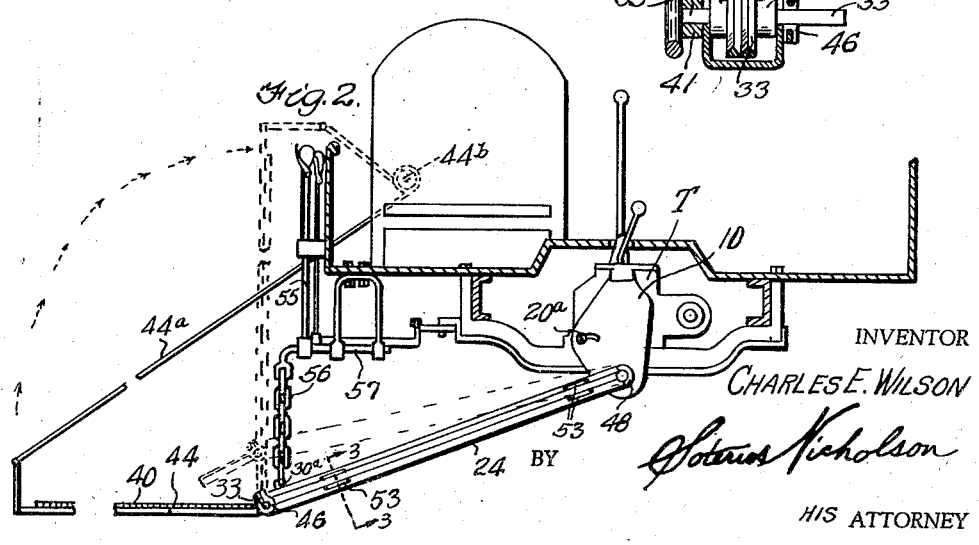

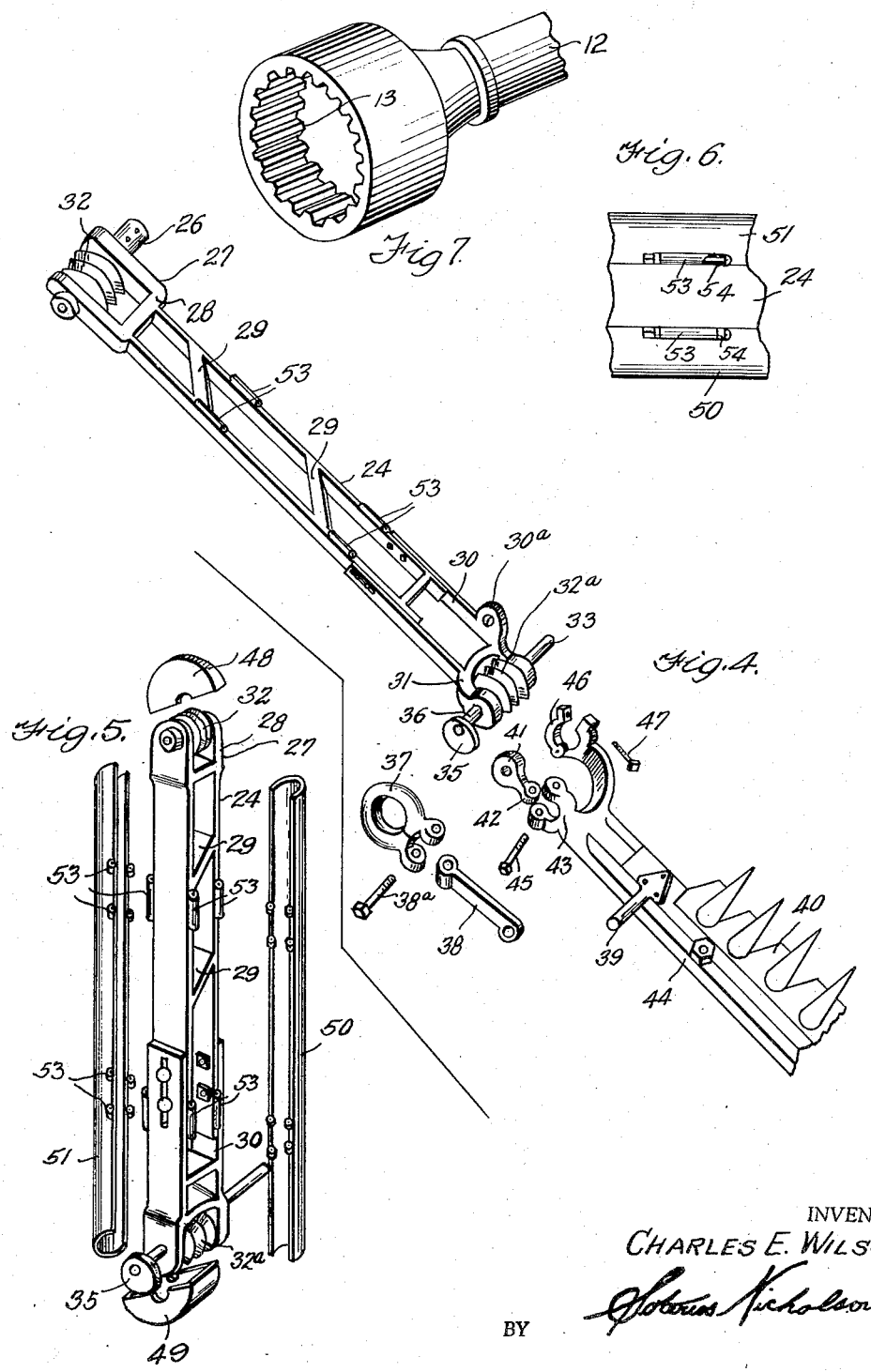

2,803,936

RECIPROCATING CUTTING ASSEMBLY

Charles E. Wilson, Bluefield, W. Va.

Application September 10, 1954, Serial No. 455,254

3 Claims. (Cl. 56—25)

This invention relates to a mowing attachment, and more especially to an attachment for a motor vehicle.

An important object of this invention is the production of a mowing attachment for a motor vehicle which may be operated in various positions and which may be lowered over the shoulder of a highway while the vehicle is kept on the surface of the highway.

A further object of the invention is the production of a simple and efficient mowing attachment wherein the power head and blade may be raised for topping grain, grass, or weeds, or may be raised to avoid rocks and other obstructions on rocky or rough ground.

Another object of this invention is the production of a mowing attachment having a safety feature which breaks out should the cutter blade strike a solid object, thereby permitting the blade to swing backwardly without damage to the cutter bar.

Other objects and advantages of the present invention will appear throughout the following specification and claims.

In the drawings:

Figure 1 is a vertical sectional view through the mower bar attachment, and showing the connection of the unit with the conventional power take-off;

Figure 2 is a transverse sectional view of a typical motor vehicle, such as a "Jeep," showing the attachment mounted thereon;

Figure 3 is an enlarged transverse sectional view taken on line 3—3 of Figure 2;

Figure 4 is a group perspective view of the mower bar supporting member and a portion of a motor bar, various parts thereof being shown detached;

Figure 5 is a group perspective view of the mower bar supporting member and protective cover elements, various parts thereof being shown detached;

Figure 6 is a fragmentary side elevational view of the mower bar supporting element, showing the connections for the cover elements.

Figure 7 is a perspective view of the conventional internal gear of the attachment which registers with the conventional drive gear of the power take-off.

By referring to the drawings in detail, it will be seen that T designates the transmission casing of a conventional motor vehicle, such for instance as the well-known "Jeep." A conventional housing H is secured to the transmission casing T, and this housing H encases a conventional power take-off pulley P, which is carried by the conventional power shaft S. The pulley P carries a conventional drive gear G constituting a primary power take-off which usually forms an integral part of the pulley P, or is fixed thereto in any desired manner.

The housing H is provided with an access aperture A in one face thereof, and a suitable removable cover plate normally covers this aperture A when desired. All of the above elements constitute standard equipment of a "Jeep," and no claim is made herein to this standard equipment. The attachment specifically described in the following may be attached to other standard equipment of the same general type, within the scope of the invention.

As is shown in Figure 1, a packaged unit mower bar attachment generally indicated as 10, comprises a pulley supporting housing 11 which is secured to one face of the housing H in any conventional manner, such for instance as by bolts, and the like. A drive shaft 12 is journalled in the housing 11 and carries a cup-shaped internal gear 13 at its inner end which projects through the aperture A of the conventional housing H. This internal gear 13 fits around and meshes with the gear G of the conventional standard equipment above described for transmitting power from the power shaft S to the drive shaft 12. The shaft 12 is journalled in the bearings 14 and 15 of the housing 11.

A clutch element 16 is fixed to the shaft 12 and a clutch element 17 is mounted on the shaft 12 and is movable into and out of a driving or clutching position with the element 16. A clutch actuating lever 18 of the conventional type is pivoted to the housing 11 and engages the element 17 to move the element 17 into and out of engagement with the element 16. A double V pulley 19 is fixed to the shaft 12, and a double V belt 20 passes thereover. This belt 20 also passes over the double V pulley 21 which is carried by the shaft 22 within the housing 11 below the shaft 12. The shaft 22 is provided with a protruding end 23 which extends beyond the housing 11. An idler pulley 20$^a$ is adjustably mounted upon the housing 11 to engage the belt 20 for regulating the tension of the belt in a conventional manner.

A mower bar supporting member generally designated as 24, is hung on the protruding end 23 of the shaft 22, and held against displacement in any conventional manner by means of screws or other suitable elements 25 which pass through the sleeve 26. The member 24 comprises a frame 27 which is hung for swinging movement upon the extension 23 of the shaft 22. This frame 27 preferably comprises a head 28 which is journalled on the extension 23, and a pair of parallel side bars 28$^a$ which are braced by the diagonal braces 29. The frame 27 is provided with an extensible end 30 which carries a pulley receiving head 31 at the extremity thereof. A double V pulley 32 is carried within the head 28 upon the extension 23, and a double V pulley 32$^a$ is carried within the head 31 upon a shaft 33. A double V belt 34 passes over the pulleys 32 and 32$^a$, and the extensible end 30 of the frame 27 facilitates the tightening of the belt 27 as will be obvious by considering Figure 1.

An eccentric wheel 35, having a convex face, is carried by an extension 36 of the shaft 33 over which fits an eccentric split collar 37 shaped to fit the wheel 35. This collar 37 is connected to a link 38 by means of a bolt 38$^a$ which in turn engages the arm 39 of the mower blade 40 for driving the mover blade 40 as the shaft 33 rotates. A link 41 is journalled on the extension of the shaft 33, and is hinged as at 42 to the yoke 43 of the mower bar 44 through the medium of a break back bolt 45 which is adapted to break under undue pressure. The yoke 43 carries a hinged safety clamp 46 which fits over the shaft 33 and is normally held in position by a breakout bolt 47. This bolt 47 is adapted to break and release the clamp 46 under undue pressure, such for instance if the mower bar 45 should strike a rock or other obstruction. This structure constitutes a safety feature and allows the mower bar 45 to swing backwards to clear an object. The operator may then connect the parts and replace the breakable bolts 45 and 47 when the device is again ready for operation.

A cap cover 48 fits over the head 28, and a cap cover 49 fits over the head 31 to shield the respective pulleys 32 and 33 and the belt 34 passing thereover. Longitudinally extending transversely bowed covers 50 and 51 are detachably secured to the edges of the frame 27 by hinge-like connections 53 which are held in position by suitable pins 54. These pins 54 may be removed for the purpose of opening the covers 50 and 51 to obtain access to the frame 27 or to the belt 34 when desired. The covers 50 and 51 act as a shield and protector for the belt 34.

The mower bar 44 may be raised and lowered by means of the lifting element 44a of a conventional type which is wound upon a conventional drum 44b, and the mower bar supporting member 24 may be raised or lowered by means of the raising and lowering chain 56 and crank bar 57 which is actuated in any conventional manner by a suitable lever 55. The mower bar 44 may be raised to the dotted line position shown in Figure 2 for cutting hedges, etc., and when desired the member 24 may be raised and the mower bar 44 lowered over a shoulder on a highway while the vehicle remains on a higher level. The mower bar supporting member 24 is hinged upon the shaft 22, and the mower bar 44 is hinged on the shaft 33 so that the member 24 may be swung upwardly or downwardly, and the mower bar 44 may also be swung upwardly and downwardly.

It should be understood that the member 24 and mower bar 44 may be mounted to extend either to the right or left of the motor vehicle upon which it is mounted, within the scope of the invention. The member 24 is provided with an apertured lug 30a near its lower end for connection with the chain 56.

Having described the invention, what I claim as new is:

1. A mower bar attachment of the class described comprising a housing adapted to detachably engage the conventional power take-off housing of a motor vehicle, a drive shaft carried by said housing, a power shaft connecting means carried by said drive shaft, a mower bar supporting member, a second shaft carried by said housing and supporting said mower bar supporting member upon said housing, means connecting said second shaft with said drive shaft for driving said second shaft, a frame mounted for swinging movement upon said second shaft, said frame being longitudinally extensible, a third shaft carried by said frame at the opposite end of the frame relative to the second shaft, a drive belt passing over the second and third shafts for driving the third shaft, a mower bar, breakable means connecting said mower bar to said third shaft, means connecting said mower bar with said third shaft for actuating said mower bar from said third shaft, longitudinal covers carried by said frame to protect said belt, and hinge-like connections detachably connecting said covers to said frame.

2. An attachment of the class defined in claim 1, wherein said covers are transversely bowed.

3. An attachment as defined in claim 1, wherein said breakable means comprises a hinged safety clamp fitting over said third shaft and a replaceable break-out bolt carried by said clamp and normally holding said safety clamp in an operative position to release said clamp under undue pressure and thereby facilitate the rearward swing of said mower bar when striking an obstruction.

References Cited in the file of this patent
UNITED STATES PATENTS

| | | |
|---|---|---|
| 2,242,917 | Martin | May 20, 1941 |
| 2,304,421 | Rogers | Dec. 8, 1942 |